INVENTORS
DOUGLAS T. KING
CHARLES FRENDOCK
BY
ATTORNEY

INVENTOR.
DOUGLAS T. KING
CHARLES FRENDOCK

BY

ATTORNEY

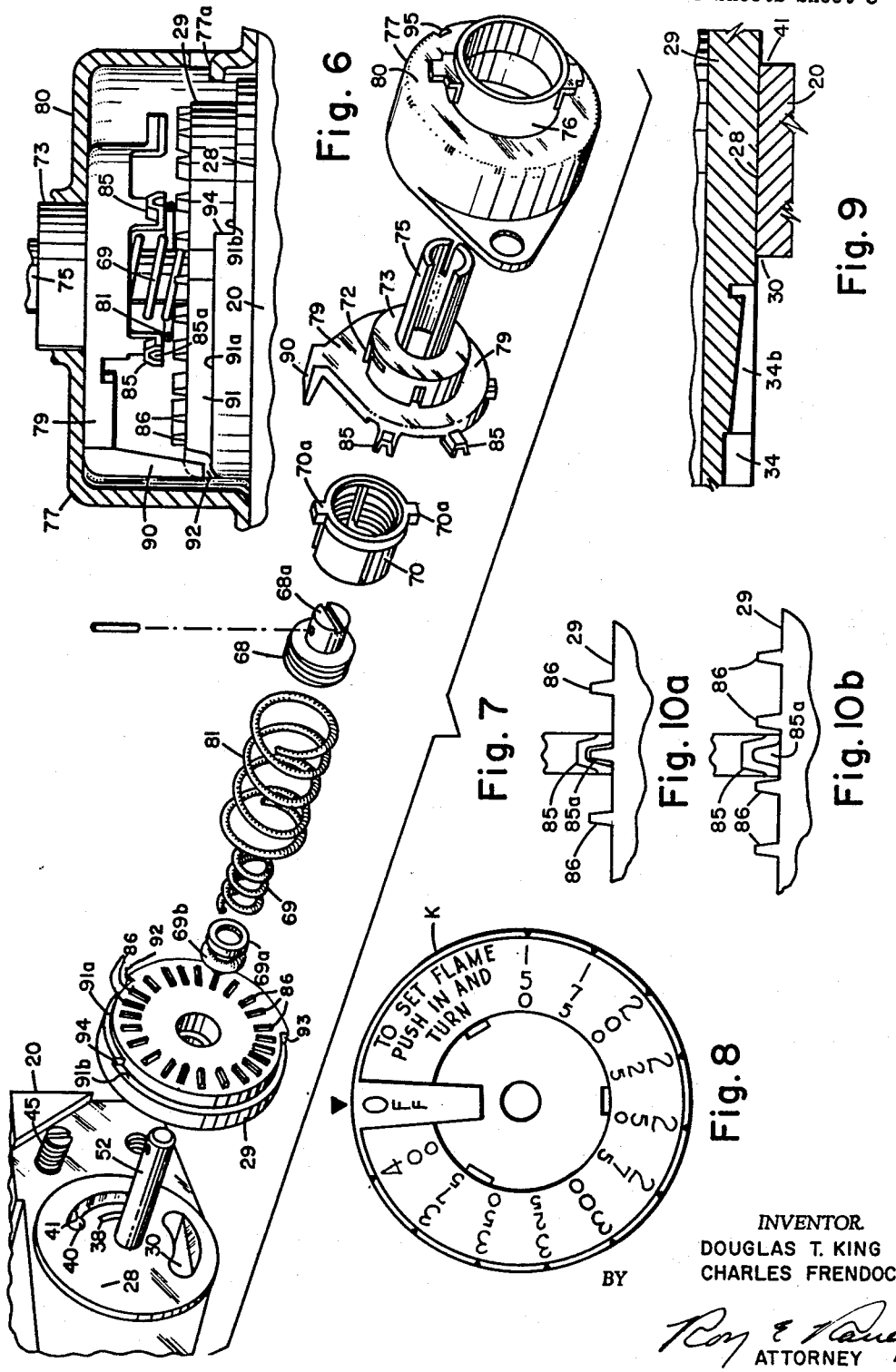

United States Patent Office 3,191,863
Patented June 29, 1965

3,191,863
THERMOSTATIC FUEL CONTROL AND FLAME
HEIGHT REGULATING VALVE
Douglas T. King, Mountainside, and Charles Frendock, Red Bank, N.J., assignors to The Wilcolator Company, Elizabeth, N.J., a corporation of Delaware
Filed Aug. 2, 1963, Ser. No. 299,598
18 Claims. (Cl. 236—99)

This invention relates to fuel control valves for regulating the supply of gas to cook stove burners and more particularly to an improved control valve of the type providing for the selection of both a temperature to be maintained and a maximum flame height at the burner through the manipulation of a single control member to effect individual adjustment of a flame height valve means and of a thermostatic valve means.

Gas valves have been proposed heretofore which permit the independent selection of both temperature and flame height by manipulation of a single control knob. However, the known valves have been subject to certain limitations such as inability to readjust the flame height while the control knob is in the temperature adjusting range, the necessity to confine the temperature adjusting range to an undesirably small degree of rotation of the control knob, and the requirement of relatively complicated interlock means to prevent improper manipulation of the control knob.

It is one important object of this invention to provide an improved fuel gas control valve comprising a single rotatable control knob for adjusting both a flame height regulating valve means and a temperature regulating thermostatic valve means, the control valve including a novel combination of drive means between the control knob and the valve means whereby the flame height valve may be selectively adjusted to trim the flame height by use of the control knob regardless of the rotative position of the control knob in its temperature selecting range of rotation.

Another object of this invention is the provision of a control valve of the foregoing character wherein the temperature adjusting range of rotation of the control knob extends throughout substantially a full turn of the control knob, whereby the temperature graduations on the knob or cooperating index are relatively spread out and afford easy selection of a desired temperature.

As another object, this invention aims to provide a flame height and temperature adjusting valve structure of the character mentioned having a control knob for rotating the temperature adjusting means throughout a relatively wide angular range and having clutch means to selectively drivingly engage the control knob with the flame height adjusting valve element, which means includes clutching surfaces rotatable with the knob and with the flame adjusting valve element one surface being annular and the other cooperating clutch surface being coaxial therewith and relatively shiftable to engage with the annular surface at substantially any relative angular position of the knob and valve element whereby the control knob can be connected with the flame height valve element at any angular position of the knob throughout the major portion of its rotative movement.

In one preferred form of the invention the clutch means comprises an annularly arranged series of teeth on the flame height adjusting valve member which are cooperable with tooth engageable dog elements on the control member.

It is still another object of this invention to provide a control valve of the character mentioned in which the flame adjusting valve element has a limited angle of rotation and the control knob is continually connected to an adjustable element of the thermostatic temperature controlling valve means and has a substantially greater angular movement than the flame height adjusting valve element, the control knob being connected to the flame adjusting valve element through a lost motion connection which permits rotation of the knob through a substantial portion of its temperature adjusting range without effecting movement of the flame height valve element and which lost motion connection is effective when the knob is rotated toward one limit of its movement to move the flame adjusting valve element to a corresponding limit of its movement, and clutch means between the knob and flame adjusting valve element operable at any point throughout a major portion of the angular movement of the knob to effect a driving connection between the knob with the valve element.

Yet another object of the invention is the provision of a gas control valve mechanism of the character mentioned comprising thermostatic valve means having a rotatable temperature adjusting element, a rotatable on-off and flame height regulating valve element, a control knob assembly rotatable between an off position and a high temperature setting position and shiftable axially between two positions and continually connected with the temperature adjusting element during rotative and axial movements, a lost motion connection being provided between the knob assembly and flame height regulating element and operative irrespective of the axial position of the knob to drivingly connect the knob assembly with the flame regulating element during rotation of the knob toward its off position to move the regulating element to its off position, the lost motion connection being operative to effect connection of the knob assembly and flame regulating element when the knob is rotated toward its high temperature position to move the regulating element from its off position toward its fully open position, and clutch means operative when the knob is shifted axially from one position to the other and at any position throughout a major portion of the range of rotative movement of the control knob to drivingly engage the knob assembly with the flame regulating element.

Other obejcts and advantages of the invention will become apparent from the following detailed description of a preferred embodiment thereof read in conjunction with the accompanying sheets of drawings forming a part of this specification, and in which FIG. 1 is a fragmentary sectional view of a gas cooking range showing in elevation a gas control valve which embodies this invention installed therein;

FIG. 6 is a fragmentary view, partly in section, illustrating the valve drive means;

FIG. 7 is a perspective exploded view illustrating the order of assembly of certain components of the valve of FIG. 1;

FIG. 8 is a front elevaiton of the control knob of the valve of FIG. 1;

FIG. 9 is a fragmentary sectional view taken along line 9—9 of FIG. 5; and

FIGS. 10a and 10b are fragmentary elevational views illustrating two modes of cooperation between clutch dog and teeth elements.

Although control valves embodying this invention may be utilized for controlling gas flow to burners of other types such as in baking ovens and the like, the invention will be described hereinafter in reference to use for controlling the flow of fuel to a top burner of a domestic range.

Figure 1:
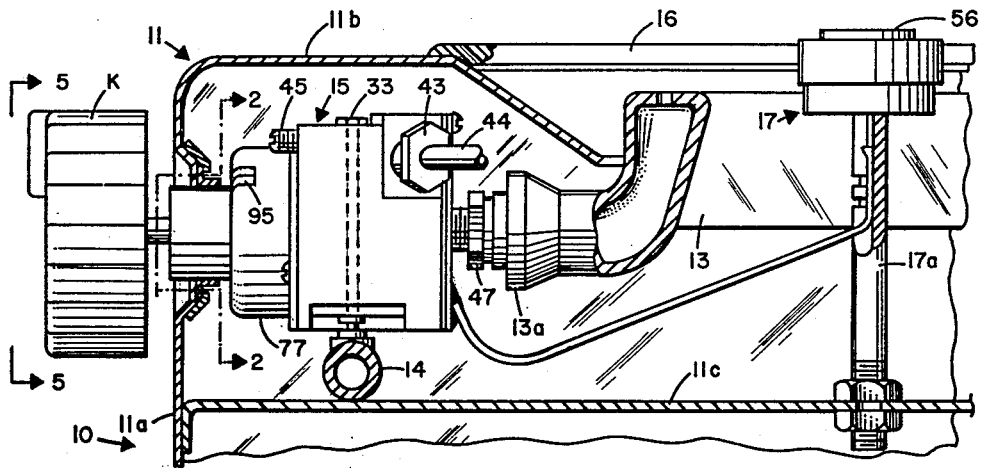

Referring to FIG. 1, there is shown a range 10 of conventional construction including a housing 11 having a front wall 11a, a top wall 11b, and a shelf 11c. The top wall 11b is dished to provide a recessed opening 12 in which is mounted an annular gas burner 13 having an inlet connection 13a. A gas supply manifold 14 extends transversely within housing 11, and a thermostatically operative gas control valve 15 embodying this invention is connected between the manifold 14 and the burner inlet 13a. The valve 15 is operative to control the flow of gas to the burner 13 to select the maximum flame height and to thermostatically modulate the flow according to the temperature of a cooking vessel (not shown) resting on a grid 16 above the burner and engaging a temperature sensing element 17 which is disposed centrally of the burner 13 and supported by a post 17a from shelf 11c.

Figure 3:
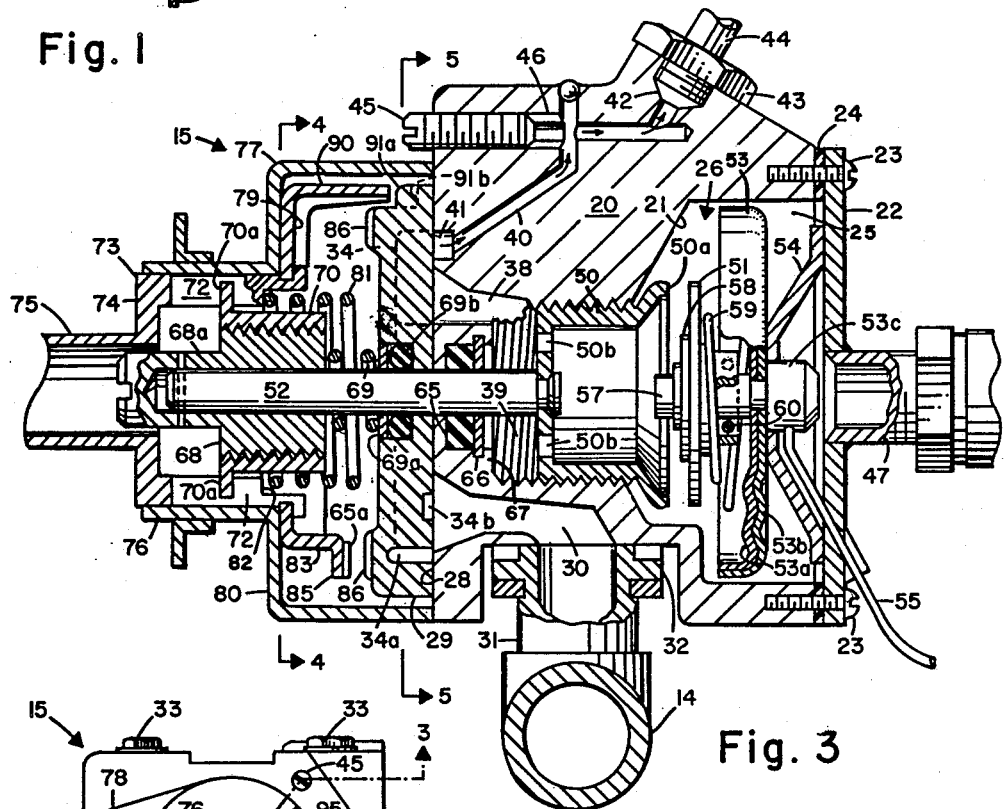
FIG. 3 is an enlarged sectional view of the valve taken substantially along line 3—3 of FIG. 2.
Figure 2:
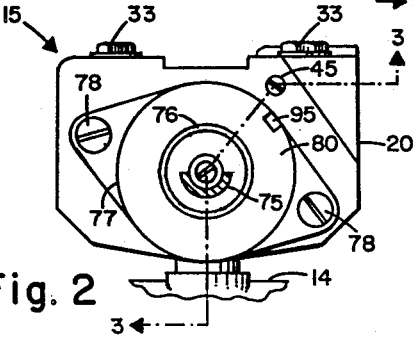
FIG. 2 is a view of the valve of FIG. 1 taken along line 2—2 thereof.

Referring now to FIG. 3, valve 15 comprises a generally rectangular body 20 having a generally conical shaped recess 21 formed therein, the larger end of which is closed by a cover member 22 secured to the body 20 by screws 23 with a suitable gasket 24 interposed therebetween to form a chamber 25. Within the chamber 25 is an adjustable, thermostatically operated modulating valve means, generally indicated at 26, which is later described in more detail and serves to modulate the flow of gas to the burner 13 to effect the thermostatic temperature regulation thereat.

Figure 5:
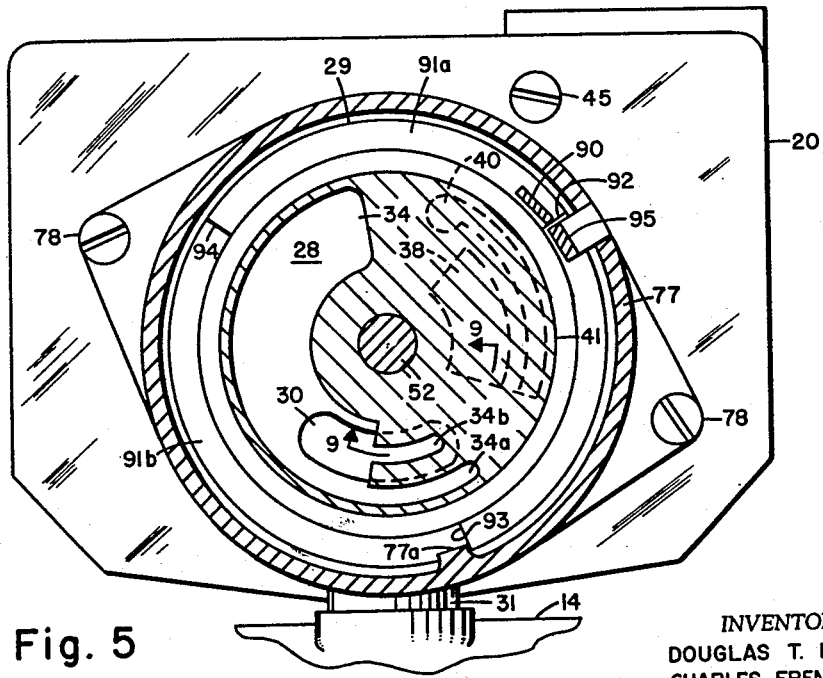
FIG. 5 is a sectional view taken substantially along line 5—5 of FIG. 3.

The other end of body 20 is provided with a flat, smooth face 28 which serves as a set for a rotatable valve disc 29 arranged to rotate relative to face 28 while maintaining a gas tight seal with the areas engaged thereby. The valve disc 29 serves as an on-off valve and also to select the maximum flame height. To this end, body 20 is provided with a gas inlet passage 30, one end of which is connected with manifold 14 by a nipple 31 having a flange 32 secured to the valve body 20 as by screws 33, and the other end of which passage opens in face 28. Referring to FIG. 5, the valve disc 29 is provided with a wide arcuate recess 34 facing surface 28. This recess covers an arc of about 175°, and is in partial registration with passage 30 when the valve disc is in a full off position as shown in FIG. 5. Arcuate concentric extensions 34a and 34b of the recess 34 extend from one end thereof for purposes which will presently become apparent. The recess 34 and extensions 34a, 34b form connections between inlet passage 30 and outlet passages through the body according to the angular position of valve disc 29 as is described more fully hereinafter.

The valve body 20 is provided with a main gas outlet passage 38 leading from surface 28 to a threaded bore 39 at the smaller end of the recess 21. A pilot burner supply passage 40 leads from an arcuate recess 41 in surface 28 to a threaded outlet 42 in which is secured a threaded connector 43 for a pilot burner supply line 44. The arcuate recess 41 in surface 28 has a radius equal to that of recess extension 34a in valve disc 29. When valve disc 29 is in its off position as shown in FIG. 5, the main flow port or passage 38 and the pilot flow passage 40 are closed off. Upon initial rotation of valve disc 29, by means described hereinafter, in a counter-clockwise direction, the recesses 34a and 41 overlap and a supply of gas is fed to pilot burner line 44 via inlet passage 30, recess extension 34a, arcuate recess 41, passage 40 and line 44 to a control pilot (not shown) adjacent burner 13. The flame height at the pilot may be adjusted by means of a plug 45 threaded into a bore 46 intersecting with passage 40 as is best shown in FIG. 3.

Valve disc 29 may be rotated in a counter-clockwise direction from the off position of FIG. 5 to bring the arcuate recess extension into overlapping relation with the main gas flow passage 38. In doing so, a path of gas flow is established between inlet passage 30 and main gas flow passage 38 via the arcuate recess 34b. Preferably, the depth of recess extension 34b is graduated as shown in FIG. 9 to provide increasing passage area as the disc 29 is turned in a counter-clockwise direction, whereby flame heights from very low to full may be precisely obtained.

Gas passes from passage 38 and threaded bore 39 into chamber 25 through the above mentioned thermostatically operated modulating or temperature regulating valve mechanism 26, and exits through an outlet nipple 47 which is brazed in an opening in cover plate 22 and is adapted to be fitted into the burner inlet connection 13a. The thermostatically operated modulating valve means 26 comprises a cup-shaped valve seat member 50 threaded into threaded bore 39 and having a circular, flaring end opening into chamber 25 to provide an annular valve seat 50a. The valve seat member 50 has an end wall provided with openings 50b through which gas enters through threaded bore 39. The seat member 50 can be rotated in the threaded bore 39 to vary its axial position relative to a thermostatically positioned disc-like valve member 51 by operation of a drive shaft 52 connected to the end wall of the valve seat member as shown. An expansible thermally responsive member 53 is rigidly mounted on cover plate 22 in spaced relation from the outlet opening defined by nipple 47 by means of a bridge-like bracket 54, and preferably comprises two nested corrugated flexible discs 53a and 53b welded together about their rims to form an expansible chamber containing a relatively small volume of thermally expansible fluid. Disc 53b has a centrally located boss 53c welded or braced to bracket 54 and is bored to receive one end of a capillary tube 55 braced therein for communication with the interior of the element 53, the other end of the tube being connected to a temperature sensing bulb 56 forming part of temperature sensing unit 17.

The element 53, tube 55, and bulb 56 are filled with a suitable fluid, preferably liquid, which expands and contracts on increases and decreases in temperature to cause corresponding distension and contraction of the expansible element 53 in response to temperature changes sensed by the bulb 56. The valve member 51 is preferably mounted on stem 57 between a bimetallic washer 58 and a spring 59 which permits limited movement of the valve member with respect to the stem to assure proper alignment with the valve seat 50a. The bimetal washer 58 flexes in response to changes in temperature in the chamber 25 to vary the spacing between the expansible member and the valve member 51 to compensate for changes in volume of the liquid inside the expansible member due to temperature changes within the valve body. A resilient O ring 60 provides a seal between the valve disc member 51 and the stem.

It will be appreciated that the flow of gas to valve seat member 50 through passage 38 may be graduated from an off condition to a full on condition according to the angular position of the valve disc 29, and that the flow of gas through the thermostatic modulating valve 26 and the outlet nipple 47 will be in accordance with the position of the valve member 51 relative to the seat member 50 as determined by the longitudinal position of member 50 in the threaded bore 39 of the valve body, and as determined by the temperature at bulb 56.

The inner end of shaft 52 is supported for axial and rotatable movement in the valve body 20. Sealing therebetween is provided by a packing washer 65 secured in a recess at the bottom of the threaded bore 39 by a washer 66 held in place by a rolled-over lip 67. The intermediate portion of shaft 52 extends freely through a central opening in the valve disc 29 and the outer end of this shaft is pinned in an externally threaded bushing 68 for rotation with the latter.

A compression spring 69 is disposed between the bushing 68 and a washer 69a for retaining an O ring 69b which encircles the shaft 52 and serves as a seal between the valve disc 29 and that shaft. In addition the spring 69 axially loads the valve seat member 50 in the threaded bore 39. Bushing 68 has a stem portion 68a, the outer end of which has a screw-driver slot which permits rotation of shaft 52 for calibrating purposes in a manner to be described hereinafter. The bushing proper is frictionally gripped in an internally threaded coupling member in the form of a sleeve 70 having diametrically extending ears 70a.

Sleeve 70 is slotted to form fingers having an inward set for resiliently and frictionally gripping the bushing 68. The ears 70a are slidably engaged in axially extending, opposed slots 72 in the cylindrical side walls of a hat-shaped control or drive member 73. The member 73 has a central end wall 74 having a central opening in which is secured a semi-cylindrical control shaft 75 through which is exposed the screw-driver slotted stem portion 68a of the bushing 68. Drive member 73 is supported for rotational and axial movement in a cylindrical sleeve portion 76 of an annular cover member 77 secured by screws 78 to the valve body 20, and ears 70a and slotted member 73 serve as a spline connection to maintain rotary driving relation between control shaft 75 and shaft 52 through the frictional engagement of sleeve 70 and bushing 68, while permitting axial movement of control shaft 75 with respect to shaft 52 and cover member 77. A control knob K, best illustrated in FIG. 8, is attached to shaft 75 for effecting manual rotation and axial movement thereof, the knob conveniently covering the calibrating stem 68a.

Figure 4:
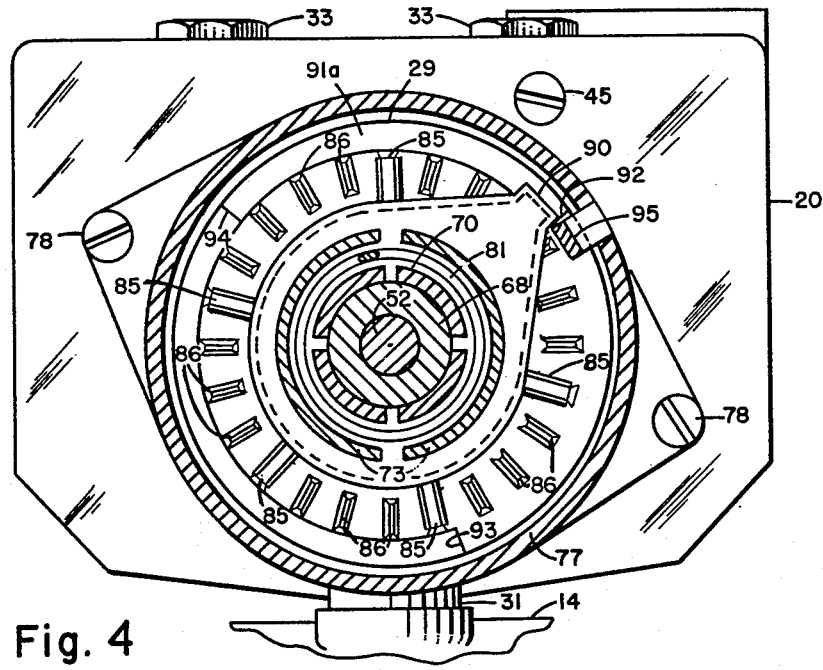
FIG. 4 is a sectional view of the valve taken along line 4—4 of FIG. 3.

The drive member 73 includes a radially extending flange 79 and is biased outwardly toward a shoulder portion 80 of cover member 77 by a compression spring 81 acting between valve disc 29 and an inner shoulder 82 in the drive member as is best seen in FIG. 3. Flange 79 is provided with a skirt 83 presenting a plurality of radially extending annularly arranged clutch dogs 85 each comprising an axially extending embossed, tooth receiving groove 85a. The clutch dogs 85 are cooperable with radially extending and axially projecting teeth 86 formed on the valve disc 29 in an annular pattern coaxial with and aligned with the pattern of the clutch dogs. It will be seen by reference to FIGS. 3, 4, and 6, that by pressing knob K and shaft 75 axially inwardly, teeth 86 of valve disc 29 will be engaged by clutch dogs 85 to drivingly connect knob K to disc 29 so that the flame height can be readily adjusted by rotation of the knob. As is best illustrated in FIGS. 10a and 10b, the teeth 86 are so spaced, and the dogs 85 are so configured, that dogs may either engage with a single tooth or may engage between two teeth. This construction provides for a large number of meshing positions with a minimum number of teeth 86. It is to be noted that this clutching action can take place at any angular setting of the knob. Upon release of knob K, spring 81 separates clutch dogs 85 from teeth 86 and returns the knob to its normal outward position in which the setting of valve seat member 50 can be adjusted by the knob without moving the valve disc 29, if desired.

In addition to the clutch means comprising dogs 85 and teeth 86, the valve disc 29 is rotatable by the knob K through lost motion connecting means between the valve disc and the flange 79 for purposes which will presently be made apparent. The lost motion connecting means comprises a tang 90 struck from the periphery of flange 79 and extending axially toward the valve disc 29 and into an arcuate relieved portion or recess 91 in the periphery of the valve disc 29. The arcuate recess 91, which has an arcuate length approximating the angular length of the temperature selecting range of the control knob K, is defined at its ends by shoulders 92 and 93, and is stepped to provide a shallower recess portion 91a from the shoulder 92 to an intermediate shoulder 94, and a deeper recess portion 91b from the intermediate shoulder 94 to the end shoulder 93. Tang 90 may engage either shoulder 92 or 93 to rotate the valve disc 29 in opposite directions when knob K is turned in opposite directions, and the tang and shoulders provide a lost motion connection between the knob and valve disc which permits movement of the knob independently of the valve disc through an angle approximately equal to the length of recess 91, which corresponds to the temperature selecting range of the knob. The arcuate length of recess portion 91b is slightly greater than the desired angle of rotation of valve disc 29, and when the disc is rotated to its "full on" position the shoulder 94 engages a limiting stop 77a in the form of a tang or lug cut from the side wall of cover 77 and projecting into recess 91b below the path of travel of tang 90.

By rotating the knob K counter-clockwise when it is in its outward axial position, the setting of valve seat member 50 is changed to increase the temperatures at which valve member 51 closes on the seat. Valve disc 29 remains in the closed position until tang 90 engages shoulder 93 and continued counter-clockwise movement of the knob causes the disc to be rotated with the tang 90 and knob K toward its fully open position until the tang strikes stop 95, which limits rotation of the knob in this direction. It will be noted that tang 90 passes over stop 77a. Valve disc 29 may then be rotated to its fully open position by turning knob K clockwise more or less, and then by depressing the knob, the clutch dogs 85 mesh with teeth 86 so that the valve disc may then be rotated counter-clockwise by rotation of the knob until shoulder 94 engages stop 77a. By releasing the knob to its de-clutched position spring 81 shifts the drive member 72 and shaft 75 outwardly to disengage the dogs 85 from the teeth 86, thereby permitting rotation of the knob K, shaft 52, and valve seat member 50 independently of the valve disc 29 to select the temperature which is to be maintained at the burner 13. If the operator then desires to make further adjustment of the flame height, it is only necessary to depress the control knob K, without first moving it from the selected temperature position, and then rotate it slightly in either direction to make the desired flame height adjustment. The knob is then released and only very slight rotation will be found necessary to make a final temperature setting.

The arcuate distance between the shoulders 92 and 93 is substantially equal to the temperature adjusting range of rotation of the knob, and is less than the full rotation of the knob by an amount equal to the rotation of the valve disc 29 from its "off" position to a relatively high flame position. Accordingly, if a high flame and temperature are desired, for example to initiate a quick boil, it is only necessary to rotate the knob in a counter-clockwise direction until the tang 90 engages the stop 95, during which rotation the tang 90 engages the shoulder 93 of the valve disc 29 and rotates the latter to a relatively high flame position, while also adjusting the thermostatic valve means to its highest temperature. After the quick boil is achieved, the knob K may be pushed in and rotated in a clockwise direction to trim the flame to a desired height, and then released and turned to select a temperature which will be maintained thereafter.

The valve disc 29 can be turned to its "full off" position by merely rotating the control knob K to its off position, during which rotation the tang 90 engages the shoulder 92 and carries it to the position in which tang 90 engages tab 95. This may be accomplished regardless of the temperature and flame setting, and without requiring any other manipulation of the knob. The flow of gas may therefore be completely interrupted by a person having no knowledge of the manner of operating the valve device of this invention, by merely treating it as a conventional valve and turning the knob to its "off" position.

From the foregoing detailed description of a preferred embodiment of this invention, it will be appreciated that there has been provided thereby an improved fuel gas control valve of the flame height and temperature regulating type having a single control knob, and which achieves those advantages and objects set out earlier in the specification. It will also be appreciated that the invention accomplishes these objects and advantages through the novel combination of a selectively engageable clutch means and a lost motion connection between the control knob and the valve disc, while maintaining continual adjusting engagement between the control knob and the thermostatic valve means.

Although the invention has been described in considerable detail with reference to a specific control valve embodying the invention, it will be understood that the valve has been described as a preferred example and that the invention is not limited thereto, but rather the invention includes all those changes, modifications, adaptations, substitutions, and uses as are reasonably embraced by the scope of the claims hereof.

Having described our invention, we claim:

1. In a gas control valve structure having a first rotatable valve element for manually adjusting gas flow and a second rotatable element for adjusting thermostatic means for modulating the gas flow to maintain a selected temperature at a gas burner or the like:
   (a) a valve body on which said first and second elements are supported for independent rotation,
   (b) a rotatable control member for rotating said elements, said control member having an angular range of movement including an off position at one end thereof and one extremity of a temperature setting range at the opposite end thereof,
   (c) clutch means operable throughout at least a major portion of said range of angular movement of said control member to engage and disengage said control member with said first element,
   (d) and means to operate said clutch means whereby said control member can be selectively placed in driving relation with said first element while said member is positioned in its temperature setting range.

2. A gas control valve as defined in claim 1, having means for limiting rotation of said control member, and means for limiting rotation of said valve element through an angle appreciably less than the angular range of rotation of said control member.

3. A gas control valve comprising:
   (a) a valve body,
   (b) a first valve element mounted on said body for rotation through a first predetermined angular distance from a "full off" position to a "full on" position with graduated "on" positions therebetween,
   (c) a second valve element mounted on said body for rotation about a common axis with said first element for conditioning thermostatic valve means to modulate gas flow so as to maintain a selected temperature at a gas burner or the like,
   (d) a control member rotatable about said axis and continually connected to said second valve element to effect rotation thereof through a second angular distance appreciably greater than said first angular distance, said control member being mounted for axial movement toward and away from said first valve element,
   (e) lost motion connection means between said control member and said first valve element for limiting relative rotational movement therebetween to a third angular distance equal to the difference between said first and second angular distances,
   (f) clutch means for alternatively connecting and disconnecting said first valve element with said control member upon said axial movement thereof toward and away from said first valve element, whereby said control member may be selectively placed in driving relation with said first valve element, and
   (g) biasing means for urging said clutch means out of engagement and for urging said control member away from said first valve element.

4. A gas control valve as defined in claim 3, wherein said clutch means comprises a plurality of teeth projecting from said first valve element toward said control member, and a dog means on said control member and cooperable with said teeth to place said control member in driving relation to said first valve element upon said axial movement of said control member toward said first valve element.

5. A gas control valve as defined in claim 1 in which said control member and rotatable elements are coaxially aligned, and means to move said control member axially thereof for actuating said clutch operating means.

6. In a control valve mechanism, a condition responsive valve structure including a rotatable control member having a range of angular movement for adjusting the responsiveness of said valve structure to said condition, a rotatable valve member having a range of angular movement, and manually operable clutch means for selectively drivingly connecting said control member to said valve member substantially at any angle throughout the range of angular movement of said control member.

7. In a control valve mechanism, a condition responsive valve structure including a rotatable control member having a range of angular movement for adjusting the responsiveness of said valve structure to said condition, a rotatable valve member having a range of angular movement substantially less than said angular movement of said control member, and manually operable clutch means for selectively drivingly connecting said control member to said valve member substantially at any angle throughout the range of angular movement of said control member.

8. In a control valve mechanism, a condition responsive valve structure including a rotatable control member having a range of angular movement for adjusting the responsiveness of said valve structure to said condition, a rotatable valve member coaxially disposed relative to said control member and having a range of angular movement, and clutch means operable by axial movement of said control member for selectively drivingly connecting said control member to said valve member substantially at any angle throughout said range of angular movement of said control member.

9. In a control valve mechanism, a condition responsive valve structure including a rotatable control member having a range of angular movement for adjusting the responsiveness of said valve structure to said condition, a rotatable valve member having a range of angular movement substantially less than said angular movement of said control member, manually operable clutch means for selectively drivingly connecting said control member to said valve member substantially at any angle throughout the range of angular movement of said control member, and lost motion connection means between said control member and said valve member to alternately drivingly connect said control member to said valve member for rotation of said valve member in either direction by said control member and to provide a substantial angle of rotation of said control member independently of said valve member between said alternate connections with said valve member.

10. In a control valve mechanism, a condition responsive valve structure including a rotatable control member having a range of angular movement for adjusting the responsiveness of said valve structure to said condition, a rotatable valve member having a range of angular movement substantially less than said angular movement of said control member, manually operable clutch means for selectively drivingly connecting said control member to said valve member substantially at any angle throughout the range of angular movement of said control member, and means biasing said clutch means to a position to disengage said control member and valve member.

11. In a control valve mechanism, a valve body having a gas flow passage therethrough, a valve member rotatably supported on said body for regulating the flow of gas through said passage, a control member supported for rotation coaxially with said valve member and being movable axially toward and from said valve member, and clutch means between said control member and valve member comprising an annular surface on one of said members facing the other member and having a multiplicity of projections extending from said surface and arranged in spaced relation about the axis of rotation of said members, and the other of said members having a recessed portion adapted to closely receive one of said projections when said control member is moved axially toward said valve member.

12. In a control valve mechanism, a valve body having a gas flow passage therethrough, a valve member rotatably supported on said body for regulating the flow of gas through said passage, a control member supported for rotation coaxially with said valve member and being movable axially toward and from said valve member, clutch means between said control member and valve member comprising a surface on one of said members facing the other member and having a multiplicity of like uniformly spaced projections extending therefrom and arranged in an annular area about the axis of rotation of said members, and the other of said members having a drive element projecting toward said one member and adapted to closely fit between any two adjacent projections of said projections when said control member is moved toward said valve member with said drive element aligned with the space between two of said projections, said drive element having a recess therein with the opening thereof facing said projections and adapted to closely receive any one of said projections therein when said control member is moved axially toward said valve member when said recess opening is aligned with the said one projection.

13. In a control valve mechanism, a valve body having a gas flow passage therethrough, a valve member rotatably supported on said body for regulating the flow of gas through said passage, a control member supported for rotation coaxially with said valve member and being movable axially toward and from said valve member, clutch means between said control member and valve member comprising a surface on one of said members facing the other member and having a multiplicity of like uniformly spaced projections extending therefrom and arranged in an annular area about the axis of rotation of said members, and the other of said members having a plurality of drive elements projecting toward said one member and spaced from one another angularly about said axis of rotation, said drive elements adapted to closely fit respectively between two adjacent projections of said projections when said control member is moved toward said valve member and said drive elements are aligned with the spaces between pairs of said projections, said drive elements each having a recess therein with the opening facing said projections and adapted to closely receive the respective said projections therein when said control member is moved axially toward said valve member and said recess openings are aligned with the respective projections.

14. In a gas control valve structure comprising a body having a gas flow passage therethrough including valve port openings arranged in series, a first valve member cooperating with one of said valve ports and rotatable through a given angle relative thereto from an "off" position to a full "on" position to regulate the flow of gas therethrough, a second valve member cooperating with a second of said valve ports for regulating the flow of gas therethrough, thermostatic means to actuate said second valve relative to said second port and including rotatable adjusting means to vary temperatures within a range of temperature settings at which said second valve member is actuated, a manual control member rotatably supported on said body and operative to rotate said adjusting means, means to limit angular movement of said control member from an "off" position to a position at one extremity of said range of temperature settings, means to limit movement of said first valve member to an angle substantially less than said angular movement of said control member, and manually actuable clutch means operative to selectively engage or disengage said rotatable control member with said first valve member throughout an angular range of movement of said rotatable member appreciably in excess of said angular movement of said first valve member.

15. In a gas control valve structure comprising a body having a gas flow passage therethrough including valve port openings arranged in series, a first valve member cooperating with one of said valve ports and rotatable through a given angle relative thereto from an "off" position to a full "on" position to regulate the flow of gas therethrough, a second valve member cooperating with a second of said valve ports for regulating the flow of gas therethrough, thermostatic means to actuate said second valve relative to said second port and including rotatable adjusting means to vary temperatures within a range of temperature settings at which said second valve member is actuated, a manual control member supported for axial and rotational movements on said body and operative to rotate said adjusting means to limit angular movement of said control member from an "off" position to a position at one extremity of said range of temperature settings, means to limit movement of said first valve member to an angle substantially less than said limited angular movement of said control member, and clutch means operative by axial movement of said control member from one axial position to another to selectively engage said rotatable control member with said first valve member throughout an angular range of movement of said rotatable member appreciably in excess of said angular movement of said first valve member.

16. In a gas control valve structure comprising a body having a gas flow passage therethrough including valve port openings arranged in series, a first valve member cooperating with one of said valve ports and rotatable through a given angle relative thereto from an "off" position to a full "on" position to regulate the flow of gas therethrough, a second valve member cooperating with a second of said valve ports for regulating the flow of gas therethrough, thermostatic means to actuate said second valve relative to said second port and including rotatable adjusting means to vary temperatures within a range of temperature settings at which said second valve member is actuated, a manual control member supported for axial and rotational movements on said body and operative to rotate said adjusting means, means to limit angular movement of said control means from an "off" position to a position at one extremity of said range of temperature settings, means to limit movement of said first valve member to an angle substantially less than said limited angular movement of said control member, clutch means operative by axial movement of said control member from one axial position to another to selectively engage said rotatable control member with said first valve member throughout an angular range of movement of said rotatable member appreciably in excess of said angular movement of said first valve member, and means biasing said control member to said one axial position.

17. In a gas control valve structure comprising a body having a gas flow passage therethrough including valve port openings arranged in series, a first valve member cooperating with one of said valve ports and rotatable through a given angle relative thereto from an "off" position to a full "on" position to regulate the flow of gas therethrough, a second valve member cooperating with a second of said valve ports for regulating the flow of gas therethrough, thermostatic means to actuate said second valve relative to said second port and including rotatable adjusting means to vary temperatures within a range of temperature settings at which said second valve member is actuated, a manual control member rotatably supported on said body and operative to rotate said adjusting means, means to limit angular movement of said control means from an "off" position to a position at one extremity of said range of temperature settings, means to limit movement of said first valve member to an angle substantially less than said angular movement of said control member, lost motion connection means between said control member and said first valve member for drivingly engaging said control member and first valve member when said control member is rotated from its "off" position toward said extremity at said temperature setting range for rotating said first valve member toward its full "on" position and when said control member is move toward its "off" position for moving said first valve member to its "off" position, and manually actuable clutch means operative to selectively engage or disengage said rotatable control member with said first valve member throughout an angular range of movement of said rotatable member appreciably in excess of said angular movement of said first valve member.

18. In a control valve mechanism comprising a valve body having a fluid passage therethrough, a first valve element rotatably mounted on said body for controlling flow of fluid therethrough and presenting first, second and third angularly spaced shoulders, said first and second shoulders defining a stepped arcuate recess having a first recess portion separated from a second recess portion by said third shoulder, first stop means projecting from said valve body into said second recess and cooperable with said second and third shoulders to limit rotation of said first valve element to a first predetermined angular distance between a "full off" position and a "full on" position, thermostatic valve means to modulate gas flow through said passage so as to maintain a selected temperature at a gas burner or the like and including an adjusting element mounted on said body for rotation about a common axis with said first element for adjusting temperatures at which said valve means operates, a control member rotatable about said axis and continually connected to said adjusting element to effect rotation thereof, said control member comprising an arm cooperable with second stop means projecting from said body to limit rotation of said control member and said second valve element to a second angular distance appreciably greater than said first angular distance, said control member being mounted for axial movement toward and away from said first valve element, said control member arm being cooperable with said first and third shoulders to limit relative rotational movement between said control member and said first valve element to a third angular distance which is substantially equal to the difference between said first and second angular distances, and clutch means for alternatively connecting and disconnecting said first valve element with said control member upon said axial movement thereof toward and away from said first valve element, whereby said control member may be selectively placed in driving relation with said first valve element.

References Cited by the Examiner

UNITED STATES PATENTS

| | | | |
|---|---|---|---|
| 2,826,368 | 3/58 | Winslow | 236—99 |
| 3,011,720 | 12/61 | Ives | 236—99 |
| 3,030,026 | 4/62 | Wiberg | 236—99 |

EDWARD J. MICHAEL, *Primary Examiner.*